United States Patent [19]
Zander et al.

[11] Patent Number: 5,295,634
[45] Date of Patent: Mar. 22, 1994

[54] FILM CASSETTE WITH SPOOL CORE HAVING FASTENING HOOK

[75] Inventors: Dennis R. Zander, Penfield; Douglas M. Csaszar, Williamson, both of N.Y.

[73] Assignee: Eastman Kodak Company, Rochester, N.Y.

[21] Appl. No.: 793,980

[22] Filed: Nov. 18, 1991

[51] Int. Cl.$^5$ .............................................. B65H 75/18
[52] U.S. Cl. .................................................. 242/71.1
[58] Field of Search ............... 242/71, 71.1, 74, 74.1, 242/71.8; 354/275

[56] References Cited

U.S. PATENT DOCUMENTS

| | | | |
|---|---|---|---|
| 1,930,144 | 10/1933 | Lee | 242/74 |
| 3,361,380 | 1/1968 | Mizutani | 242/74 |
| 3,383,069 | 5/1968 | Riedel et al. | 242/74 |
| 3,481,552 | 12/1969 | Gersch et al. | 242/71.1 |
| 3,752,416 | 8/1973 | Fukatsu et al. | 242/195 |
| 3,880,373 | 4/1975 | Cook | 242/56 |
| 4,181,271 | 1/1980 | Kluczynski et al. | 242/74 |
| 4,303,325 | 12/1981 | Seely | 354/212 |
| 4,398,679 | 8/1983 | Kluczynski | 242 X/74.1 |
| 4,623,232 | 11/1986 | Wong et al. | 354/173.1 |
| 4,834,310 | 5/1989 | Ikariya | 242/74 |
| 4,852,821 | 8/1989 | Harris | 242/71.8 |
| 4,930,712 | 6/1990 | Smart | 242/74 |
| 4,955,555 | 9/1990 | Pierson et al. | 242/74 |
| 4,965,616 | 10/1990 | Horiuchi | 354/212 |
| 4,974,788 | 12/1990 | Covington | 242/74.1 |
| 4,978,084 | 12/1990 | Harris et al. | 242/74 |
| 4,984,751 | 1/1991 | Hoffacker | 242/74 |
| 4,986,486 | 1/1991 | Kemp | 242/74.1 |

FOREIGN PATENT DOCUMENTS

| | | |
|---|---|---|
| 0077972 | 10/1982 | European Pat. Off. . |
| 0186824 | 12/1985 | European Pat. Off. . |
| 0342372 | 4/1989 | European Pat. Off. . |
| 44-8856 | 4/1969 | Japan . |
| 19698856 | 4/1969 | Japan . |

Primary Examiner—Daniel P. Stodola
Assistant Examiner—Eileen Dunn
Attorney, Agent, or Firm—Roger A. Fields

[57] ABSTRACT

In a film cassette, a spool core about which a filmstrip is coiled is rotated in an unwinding direction to thrust a leading end portion of the filmstrip from inside to outside the cassette. The filmstrip has a trailing or inner end portion with a hole in it. The spool core includes a double-hook piece in the hole having a shorter hook and a longer hook. The shorter hook projects from the hole in the unwinding direction to slightly overlie the trailing end portion to engage the trailing end portion for pushing the filmstrip off the spool core to thrust the leading end portion outside the cassette when the spool core is rotated in the unwinding direction, but which will exit the hole as the trailing end portion begins to separate from the spool core. The longer hook projects from the hole in a winding direction to substantially overlie the trailing end portion to engage the trailing end portion for preventing the trailing end portion from completely separating from the spool core when the shorter hook is removed from the hole, but which can be backed out of the hole by rotating the spool core relative to the trailing end portion in the unwinding direction.

3 Claims, 18 Drawing Sheets

FILM CASSETTE WITH SPOOL CORE HAVING FASTENING HOOK

CROSS-REFERENCE TO RELATED APPLICATIONS

Reference is made to commonly assigned copending applications Ser. No. 07/787,356, entitled FILM CASSETTE WITH INTEGRATED CASSETTE ELEMENT LOCK AND LIGHT BLOCKING DEVICE and filed Nov. 4, 1991 in the name of Dennis R. Zander, Ser. No. 07/787,802, entitled FILM CASSETTE WITH UNITARY FILM STRIPPER AND LIGHT BLOCKING DEVICE and filed Nov. 4, 1991, in the name of Dennis R. Zander, and Ser. No. 07/787,803; entitled FILM CASSETTE WITH FLANGED FILM SPOOL and filed Nov. 4, 1991 in the name of Dennis R. Zander.

BACKGROUND OF THE INVENTION

1. Field of the Invention

The invention relates generally to the field of photography, and in particular to a film cassette containing roll film.

2. Description of the Prior Art

Commonly assigned U.S. Pat. No. 5,031,852, issued Jul. 16, 1991 discloses a film cassette wherein a film roll whose outermost convolution is a film leader is coiled about a spool core rotatable within the cassette shell in film unwinding and winding directions. A pair of flexible flanges are coaxially arranged on the spool core to radially confine the film leader within respective skirted peripheries of the flanges to prevent the leader from clock-springing against an interior wall of the cassette shell. A film stripper projects from the interior wall to be received between a leading end portion of the film leader and the next inward convolution of the film roll to free the leader from the flanges and guide it into a lighttight passageway to the exterior of the cassette shell responsive to rotation of the spool core in the unwinding direction. Thus, when the spool core is rotated in the unwinding direction, the film leader will be thrust or propelled from inside to outside the cassette shell.

Various means such as tape or a fastening hook may be devised for attaching an inner or trailing end portion of the film roll to the spool core. However, such known means have been found not to work well in the film cassette.

SUMMARY OF THE INVENTION

In a film cassette, a spool core about which a filmstrip is coiled is rotated in an unwinding direction to thrust a leading end portion of the filmstrip from inside to outside the cassette. The filmstrip has a trailing or inner end portion with a hole in it. The spool core includes a double-hook piece in the hole having a shorter hook and a longer hook. The shorter hook projects from the hole in the unwinding direction to slightly overlie the trailing end portion to engage the trailing end portion for pushing the filmstrip off the spool core to thrust the leading end portion outside the cassette when the spool core is rotated in the unwinding direction, but which will exit the hole as the trailing end portion begins to separate from the spool core. The longer hook projects from the hole in a winding direction to substantially overlie the trailing end portion to engage the trailing end portion for preventing the trailing end portion from completely separating from the spool core when the shorter hook is removed from the hole, but which can be backed out of the hole by rotating the spool core relative to the trailing end portion in the unwinding direction.

Since the shorter hook and the longer hook can each be disengaged from the trailing end portion of the filmstrip without damaging the filmstrip, the filmstrip can be completely removed from the film cassette for processing or other purpose and then returned to the cassette to be re-engaged with the hooks. Thus, the processed film can be stored in the cassette.

DETAILED DESCRIPTION OF THE PREFERRED EMBODIMENT

The invention is disclosed as being embodied preferably in a 35 mm film cassette. Because the features of this type of film cassette are generally known, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
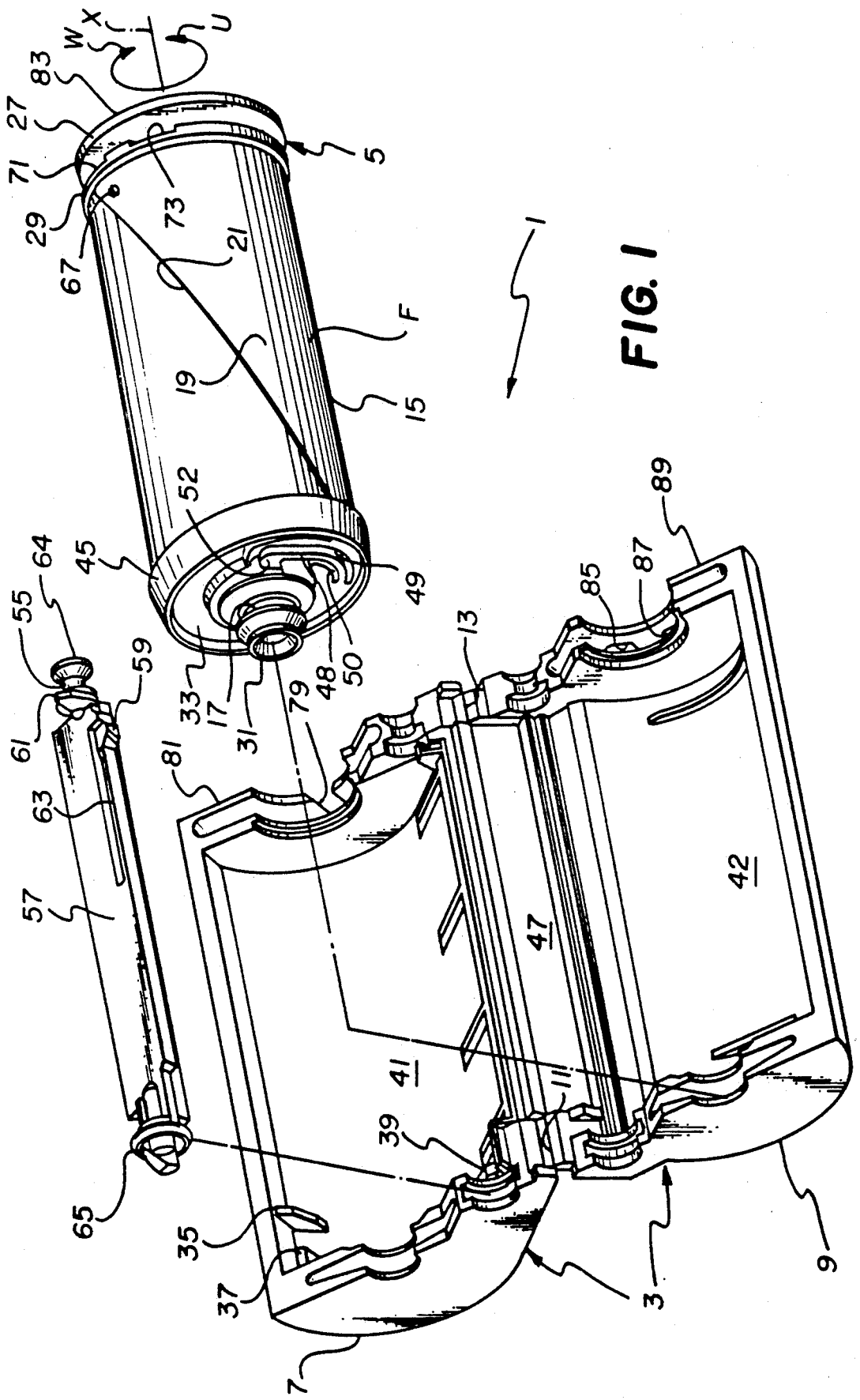
FIG. 1 is an exploded perspective view of a film cassette according to a preferred embodiment of the invention, showing two halves of the cassette shell opened and the various cassette components removed from the shell halves.
Figure 2:
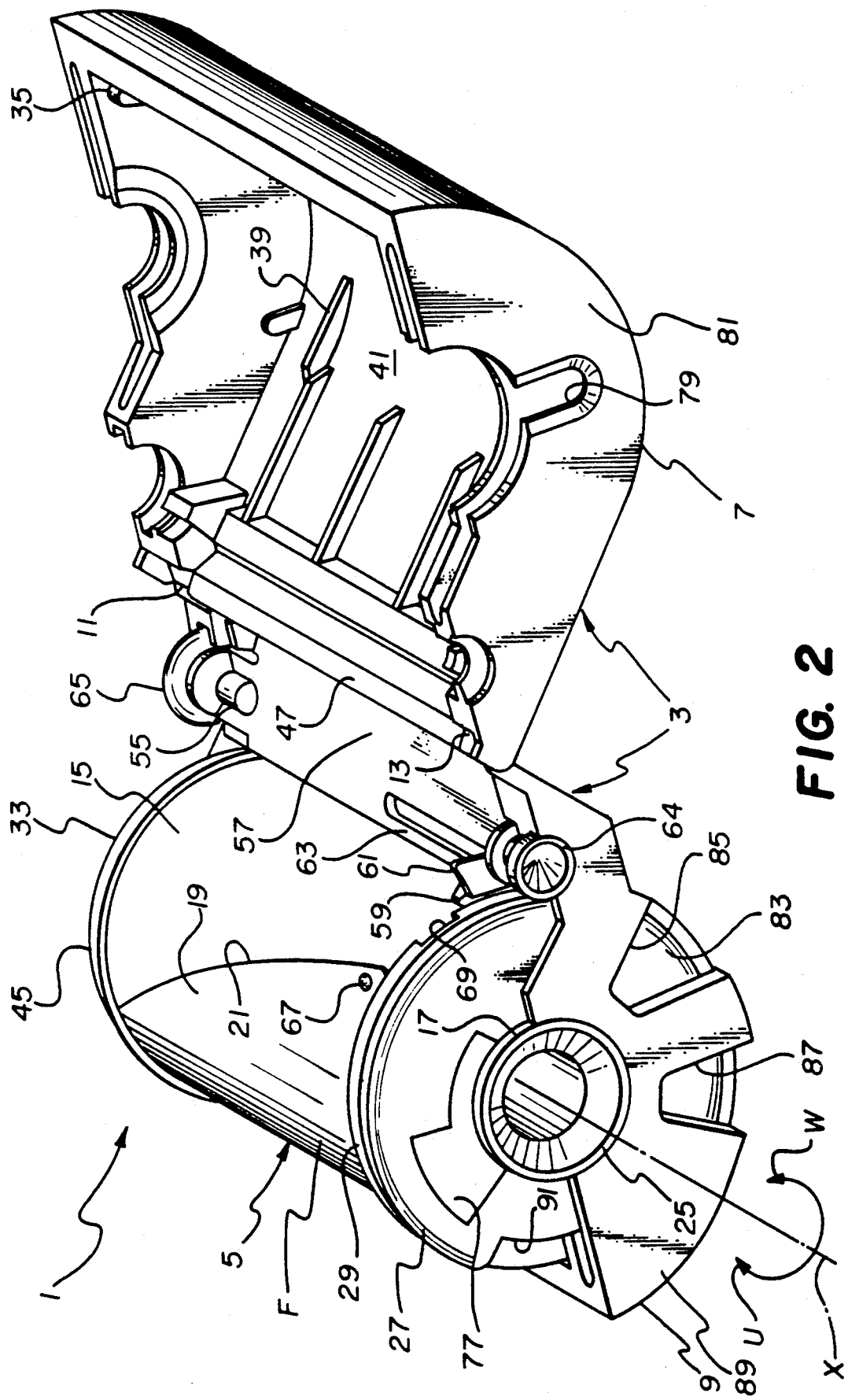
FIG. 2 is a perspective view of the film cassette, showing the two shelf halves opened with the various cassette components in place.
Figure 3:
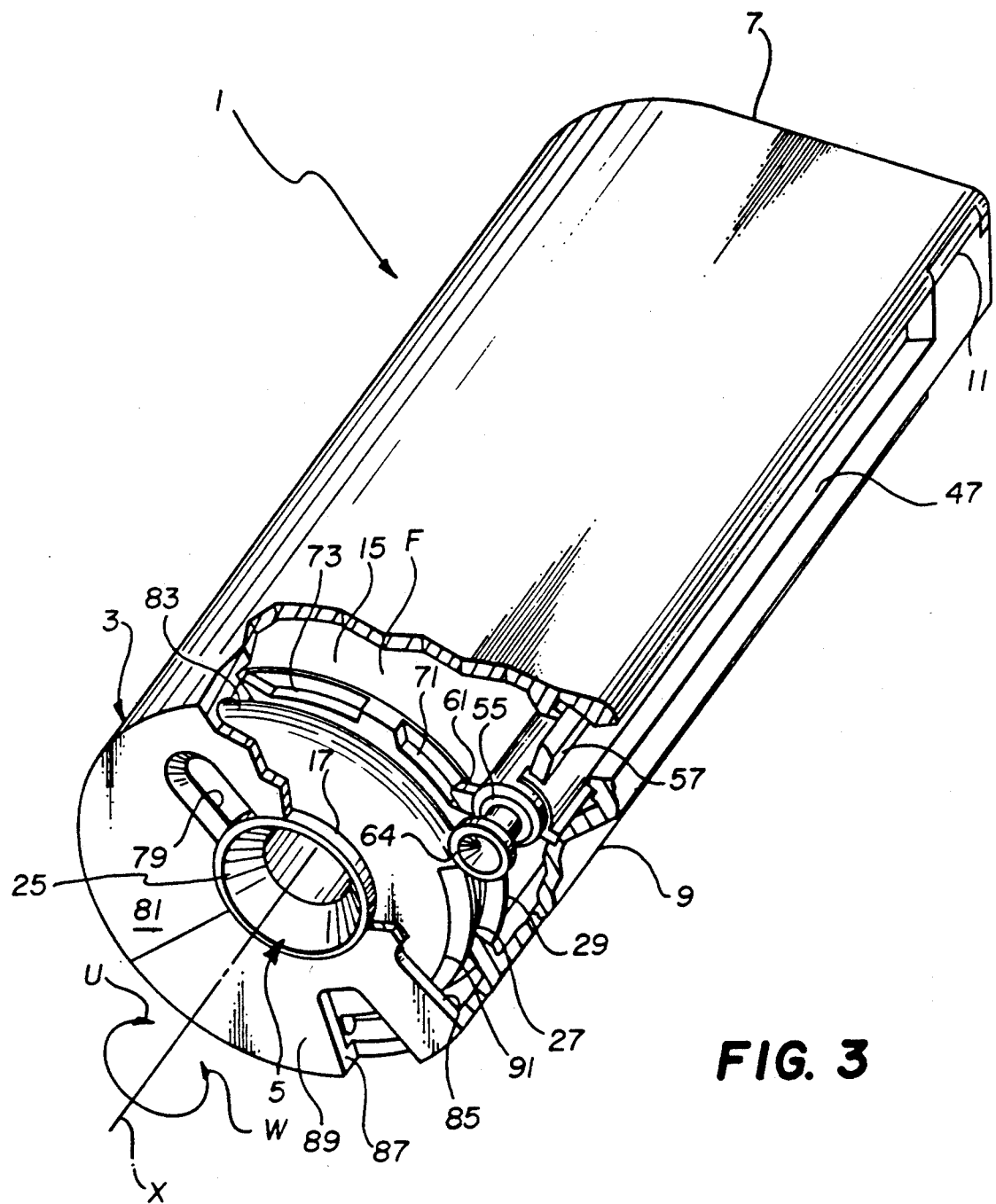
FIG. 3 is a perspective of the film cassette partly cut away.

Referring now to the drawings, FIGS. 1 and 2 show a 35 mm film cassette 1 comprising a cassette shell 3 and a film spool 5. The film spool 5 is rotatable about an axis X in film unwinding and film winding directions U and W inside the cassette shell 3. The cassette shell 3 consists of two shell halves 7 and 9 which are connected by a pair of spaced, integrally formed hinges 11 and 13 and otherwise are secured together by known means.

Figure 4:
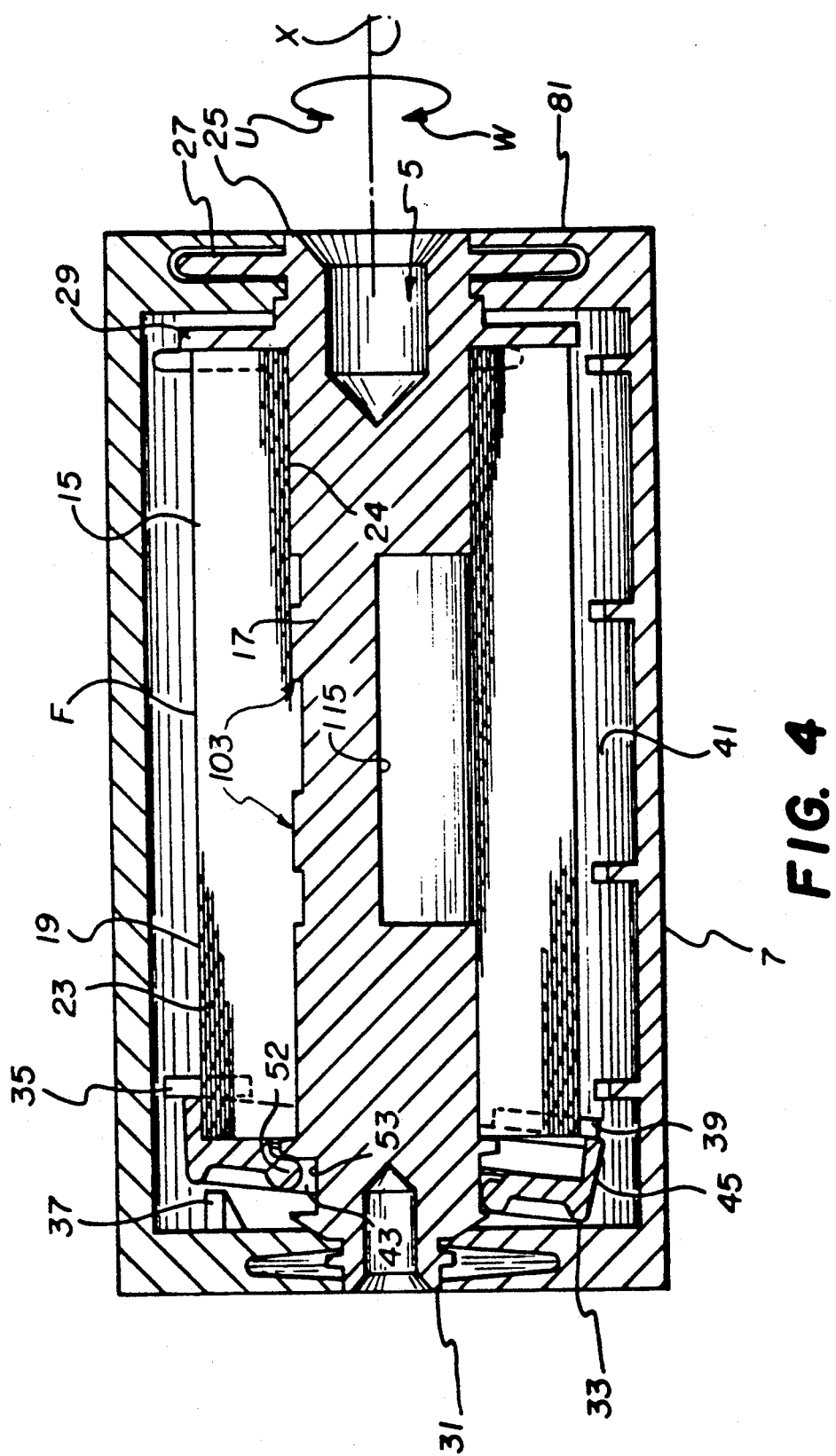
FIG. 4 is an elevation view in cross-section of the film cassette.
Figure 8:
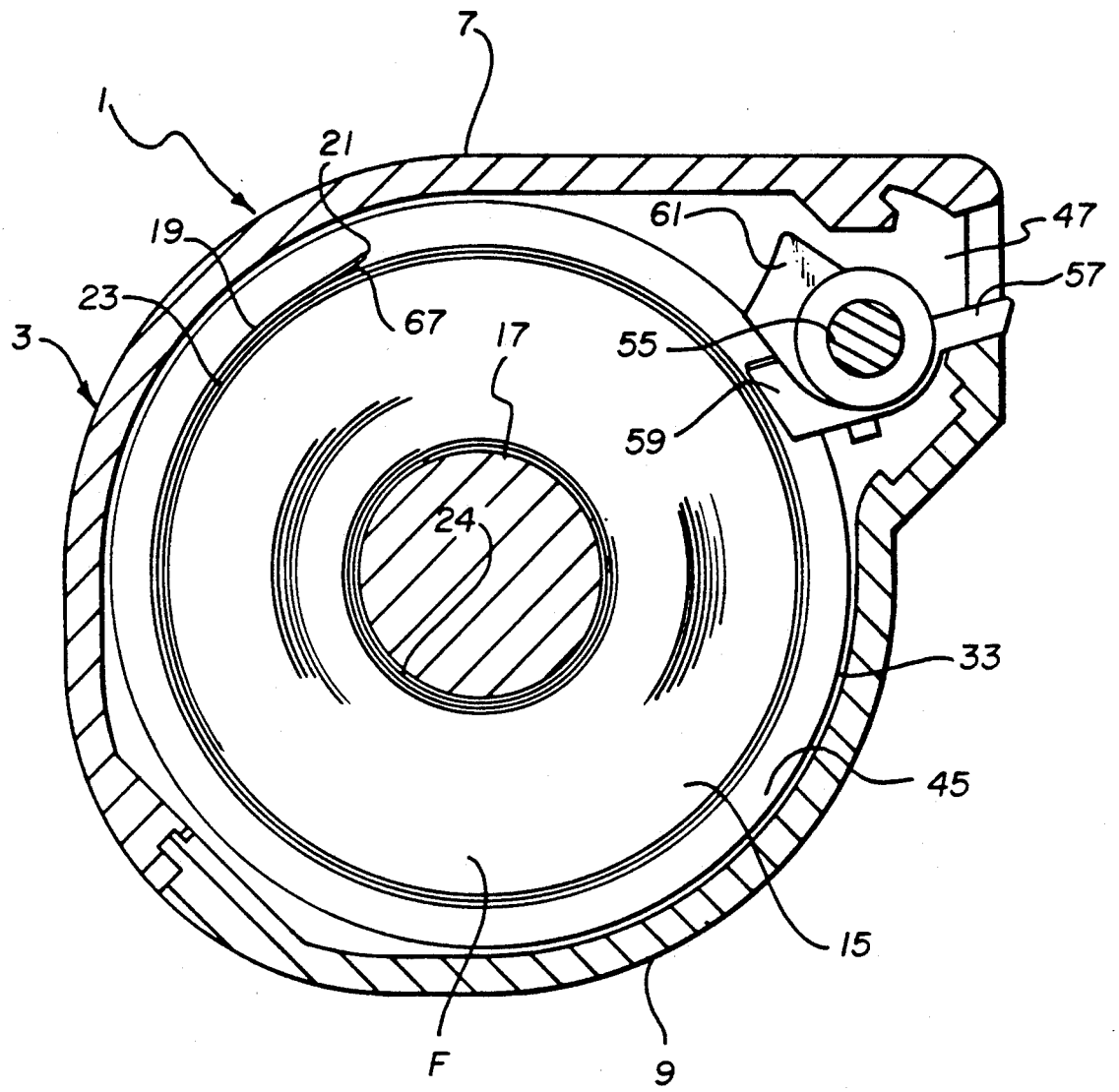
Figure 15:
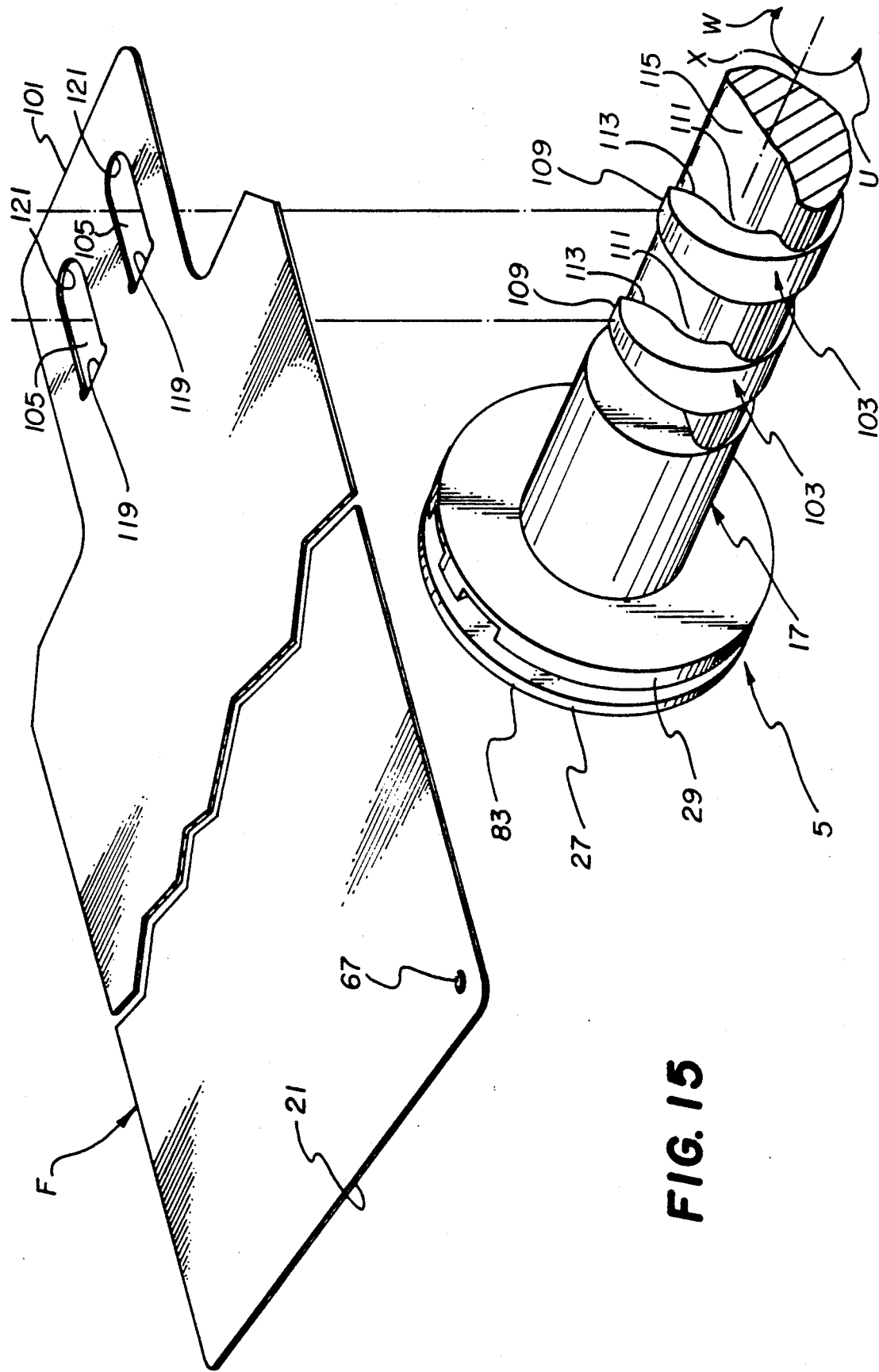
FIG. 15 is a perspective view of the spool core partly in section and an inner or trailing film end portion.
Figure 16:
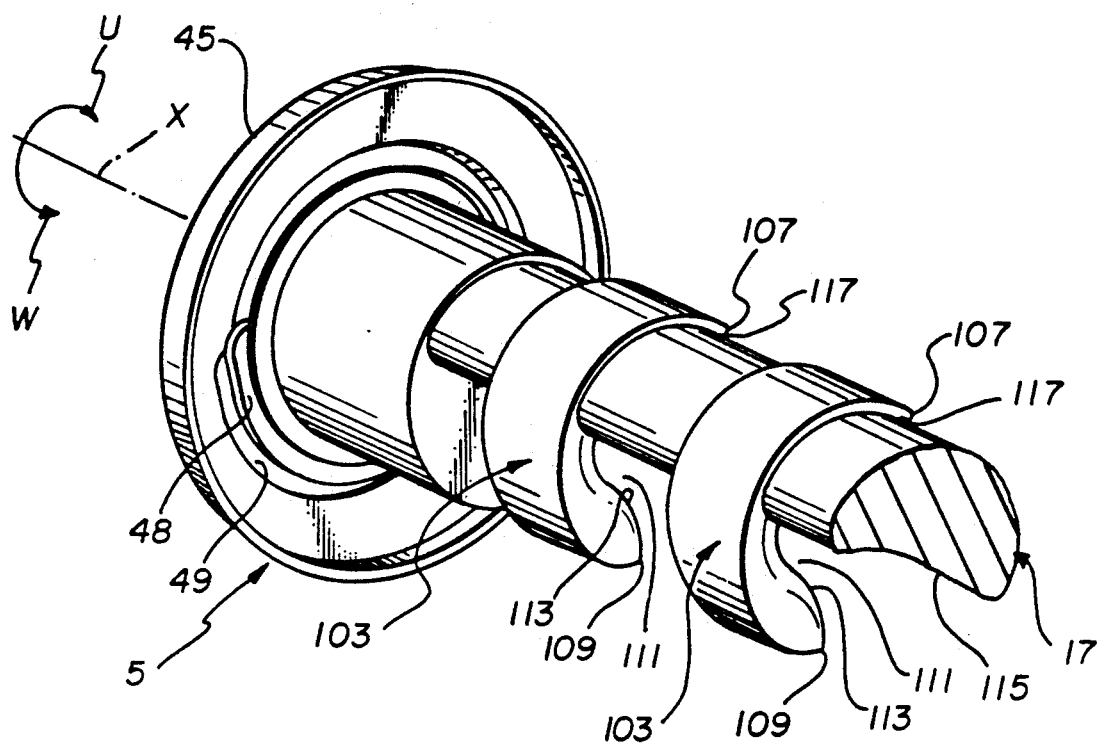
FIGS. 16 and 17 are perspective views of the spool core partly in section as seen from various angles not shown in FIG. 15.
Figure 17:
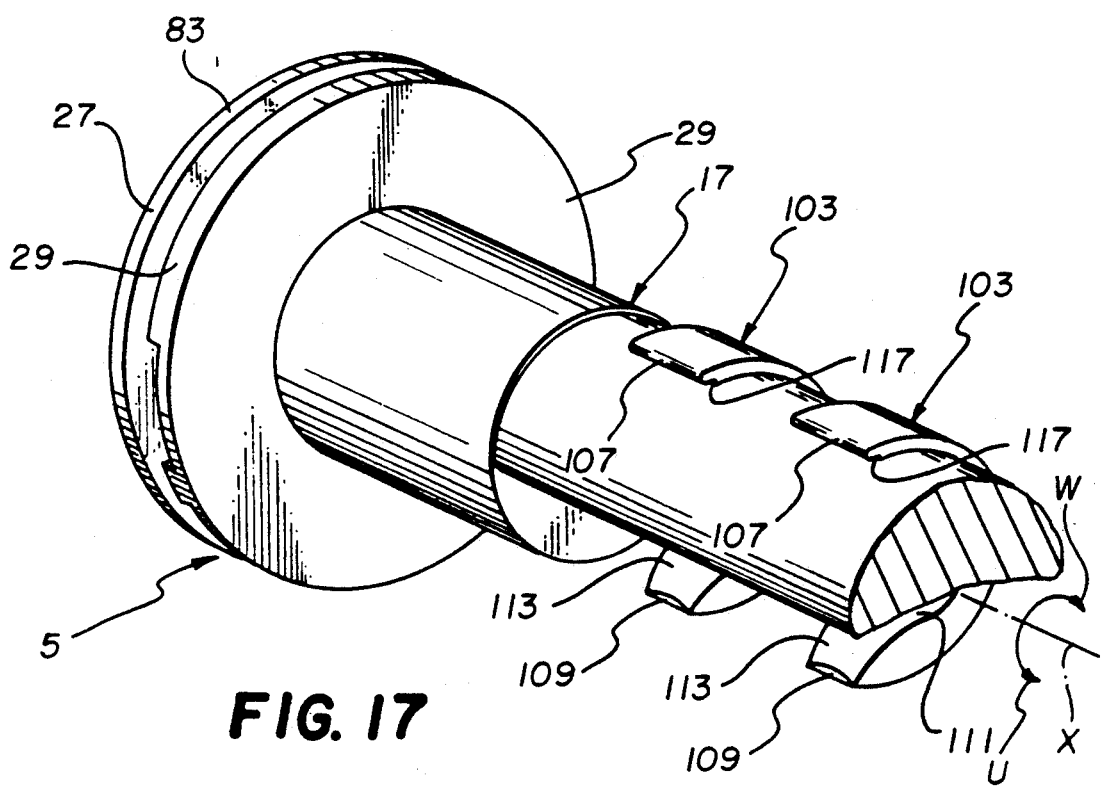
Figure 18:
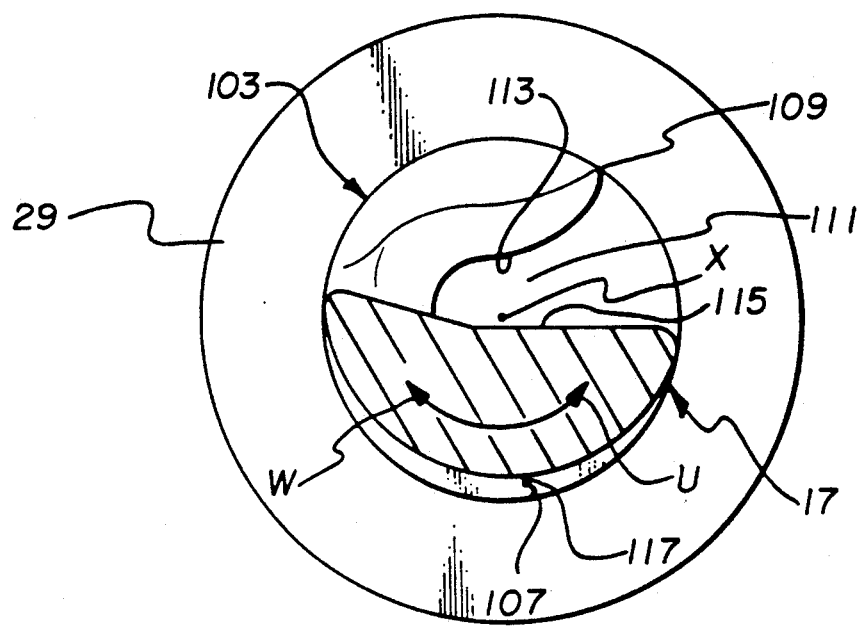
FIG. 18 is a plan view of the spool core partly in section.

A roll 15 of 35 mm filmstrip F is coiled about a core or hub 17 of the film spool 5 to form successive convolutions of the filmstrip. As shown in FIGS. 4 and 8, the film roll 15 includes an outermost convolution which is a film leader 19 having a leading or forward inclined end portion 21, and it includes a next inward convolution 23 coiled beneath the outermost convolution. An inner or trailing end portion 101 of an innermost convolution 24 of the film roll 15 is removably secured to the spool core 17 by a pair of identical double-hook pieces 103 fixed to the spool core. See FIG. 15.

Adjacent one end 25 of the spool core 17, a pair of parallel inner and outer rigid disks 27 and 29 are integrally formed with the spool core. Both of the disks 27 and 29 are arranged perpendicular to the axis X. See FIGS. 1–4. Adjacent another end 31 of the spool core 17, a rigid flange 33 is supported inclined to the axis X by four disk guides 35, 37 and 39, only three shown, projecting from an inner wall 41 of the shell half 7. Other disk guides, not shown, project from an inner wall 42 of the shell half 9. The flange 33 has a central opening 43 through which the spool core 17 extends to allow rotation of the spool core independently of the flange, and it includes an annular lip or skirt 45 which circumferentially extends from the flange. As shown in FIGS. 1 and 4, the inner disk 29 and the flange's annular lip 45 are spaced from each other a distance that is less than the width W of the filmstrip F for an approximately 270° arc that is remote from a film egress/ingress passageway 47 to outside the cassette shell 3, to radially confine the film leader 19 to the film roll 15 along that arc in order to substantially prevent clock-springing of the film roll against the respective inner walls 41, 42 of the shell halves 7, 9. Conversely, the inner disk 29 and the flange's annular lip 45 are spaced from each other a distance that is greater than the width W of the filmstrip F for an approximately 90° arc that is close to the passageway 47, to allow the film leader 19 beginning with its leading end portion 21 to escape the radial confinement of the flange s annular lip along that arc in order to enter the passageway. A functionally similar arrangement is disclosed in commonly assigned U.S. Pat. No. 4,832,275, issued May 23, 1989.

Flange To Spool Core Engagement

Figure 5:
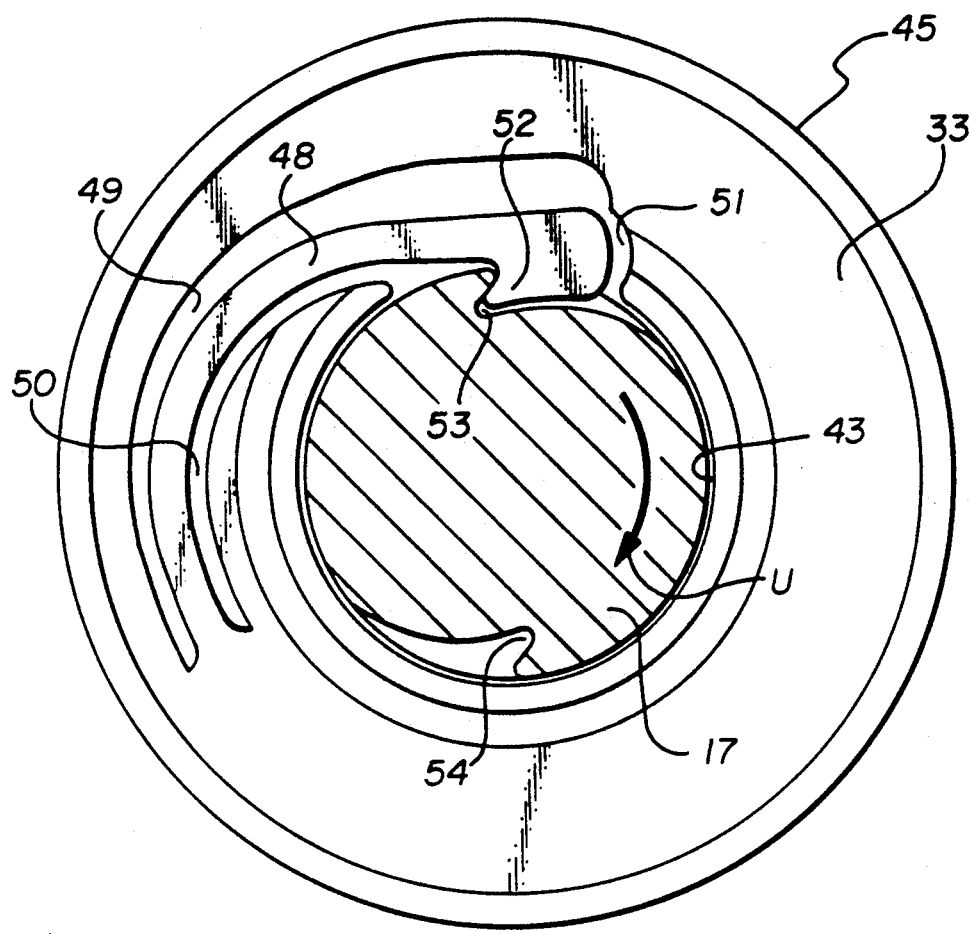
FIG. 5 is a plan view in cross-section of a flange to spool core engagement in the film cassette.

The flange 33 includes an integrally formed resilient cantilever 48 bordered by a pair of longitudinal slits or openings 49 and 50 cut in the flange to interconnect at a common opening 51 to the central opening 43 of the flange. See FIG. 5. The cantilever 48 has a free end portion at the common opening 51 which defines a locking pawl 52 that is inherently biased against the periphery of the spool core 17 at a location within the central opening 43, to drop into either one of two identical notches or detents 53 and 54 cut in the periphery of the spool core. When the locking pawl 52 rests against the periphery of the spool core 17, the cantilever 48 occupies the longitudinal slit 49. When the locking pawl 52 is in one of the detents 53, 54, it is removed from the longitudinal slit 49. The locking pawl 52 and the detents 53, 54 are complementarily shaped to locking engage the pawl and one of the detents when the spool core 17 is rotated relative to the flange 33 in the unwinding direction U. Once the locking pawl 52 and one of the detents 53, 54 are lockingly engaged, the flange 33 must rotate with the spool core 17 in the unwinding direction. Conversely, the locking pawl 52 and the detents 53, 54 are complementarily shaped to disengage the pawl and one of the detents and force the pawl onto the periphery of the spool core 17 when the spool core is rotated relative to the flange 33 in the winding direction W. Other details of the locking pawl 52 and the detents 53, 54 are disclosed in, cross-referenced application Ser. No. 07/787,803. Another type of flange to spool core engagement arrangement is disclosed in commonly assigned U.S. Pat. No. 5,031,852, issued Jul. 16, 1991.

Unitary Film Stripper, Spool Lock and Light Valve

A control shaft 55 has an integrally formed light valve 57, film stripper 59 and spool lock 61. See FIGS. 1–4. The stripper 59 comprises the free end of a resilient cantilever 63 extending from the control shaft 55.

The control shaft 55 is rotatably supported within the cassette shell 3 by the shell halves 7 and 9. See FIGS. 1–3. Opposite ends 64 and 65 of the control shaft 55 are accessible at the exterior of the cassette shell 3 for engagement to rotate the control shaft.

Figure 6:
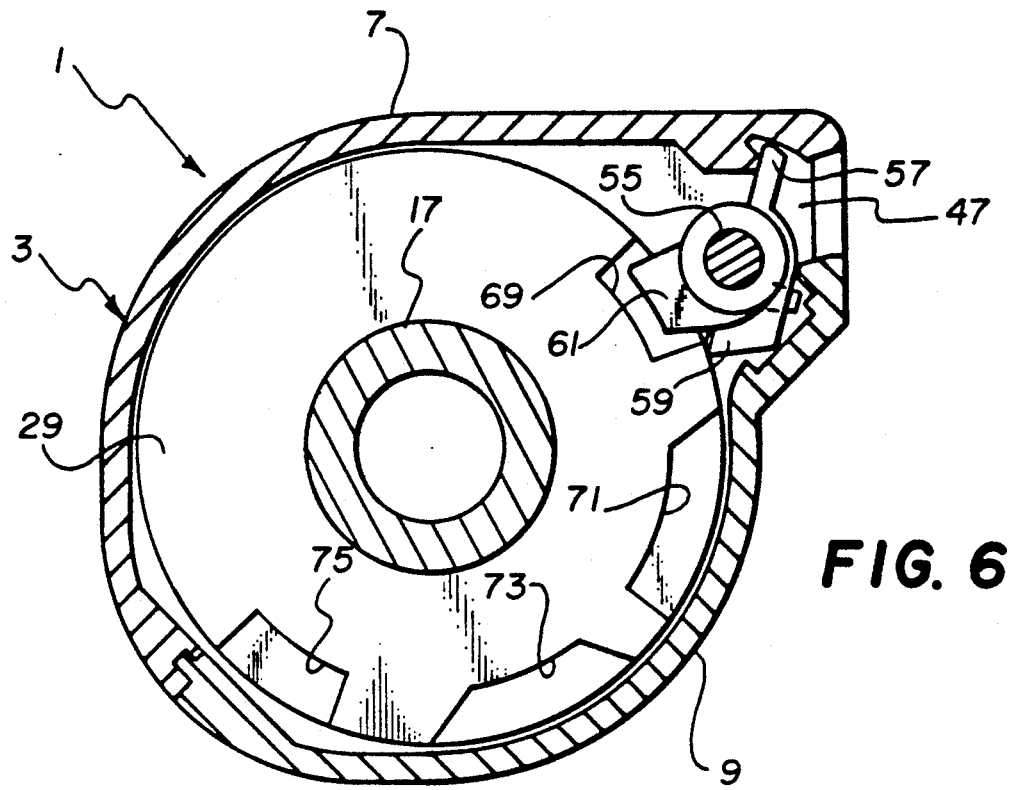
FIGS. 6-14 are either plan views in crosssection or end views of the film cassette, showing operation of a unified light valve, film stripper and spool lock.

As shown in FIG. 6, when the control shaft 55 is rotationally oriented with the light valve 57 in a light blocking or closed position extending across the film egress/ingress passageway 47 to prevent ambient light from entering the cassette shell 3 through the passageway, the film stripper 59 is in a non-stripping position removed from the film roll 15. Conversely, as shown in FIG. 8, when the control shaft 55 is rotationally oriented with the light valve in a non-blocking or opened position to allow movement of the filmstrip F through the passageway 47, the stripper 59 is in a stripping position to be received between the leading end portion 21 of the film leader 19 and the next-inward convolution 23 of the film roll 15 responsive to rotation of the film spool 5 in the unwinding direction U. Other details of the stripper 59 are disclosed in cross-referenced application Ser. No. 7/787,802. If the film spool 5 is rotated in the unwinding direction U with the stripper 59 in its stripping position, the film leader 19 beginning with the leading end portion 21 will be guided by the stripper from between the flange's annular lip 33 and the inner disk 29 into the passageway 47. A protruberance 67 may be provided on the underside of the film leader 19 at a location along its leading end portion 21 to normally lie against the outerside of the next-inward film convolution 23, to maintain a slight space between the leading end portion and the next-inward film convolution for receipt of the stripper 59. See FIG. 8.

Figure 7:
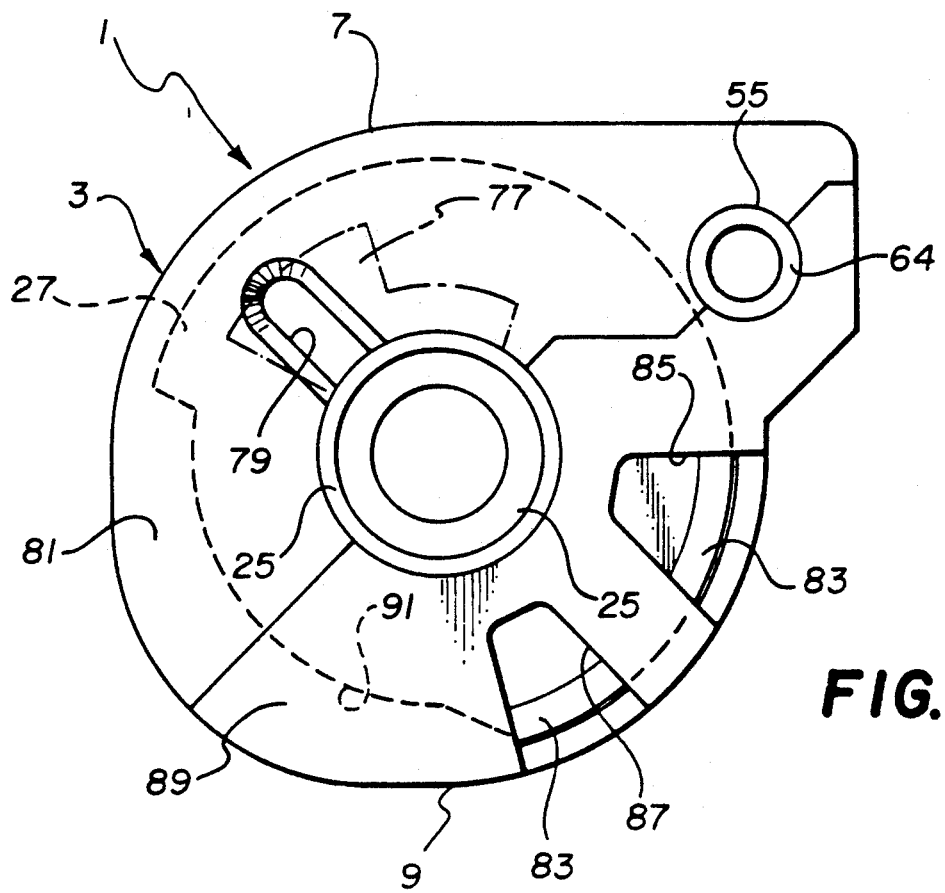
Figure 9:
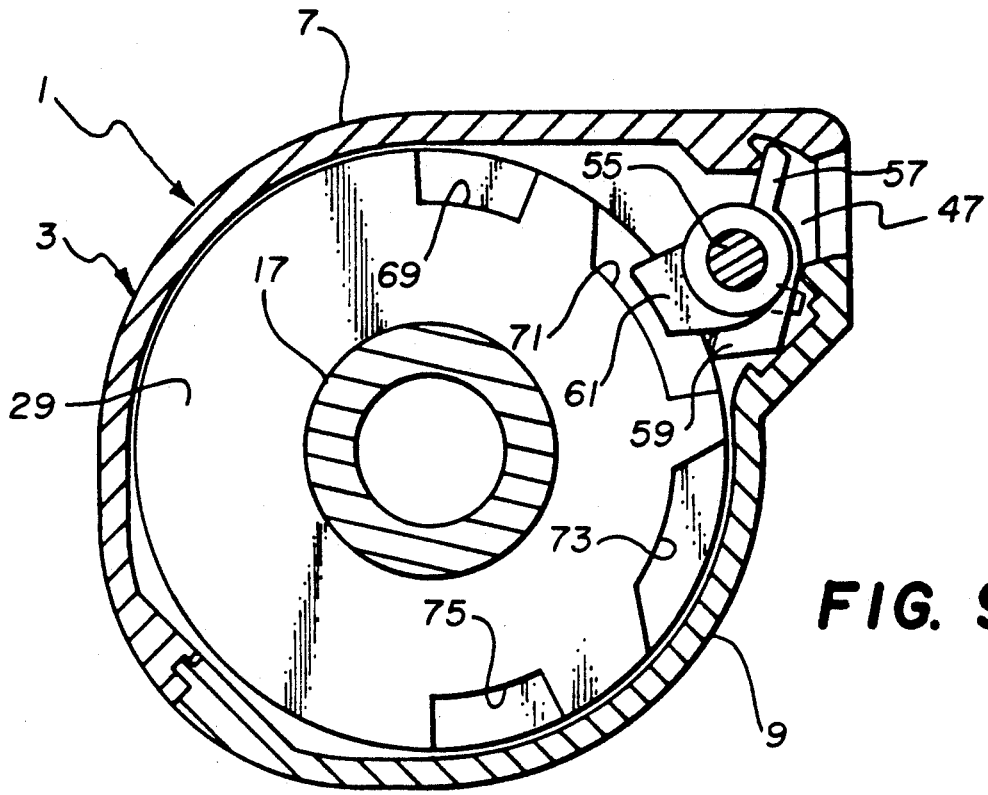
Figure 10:
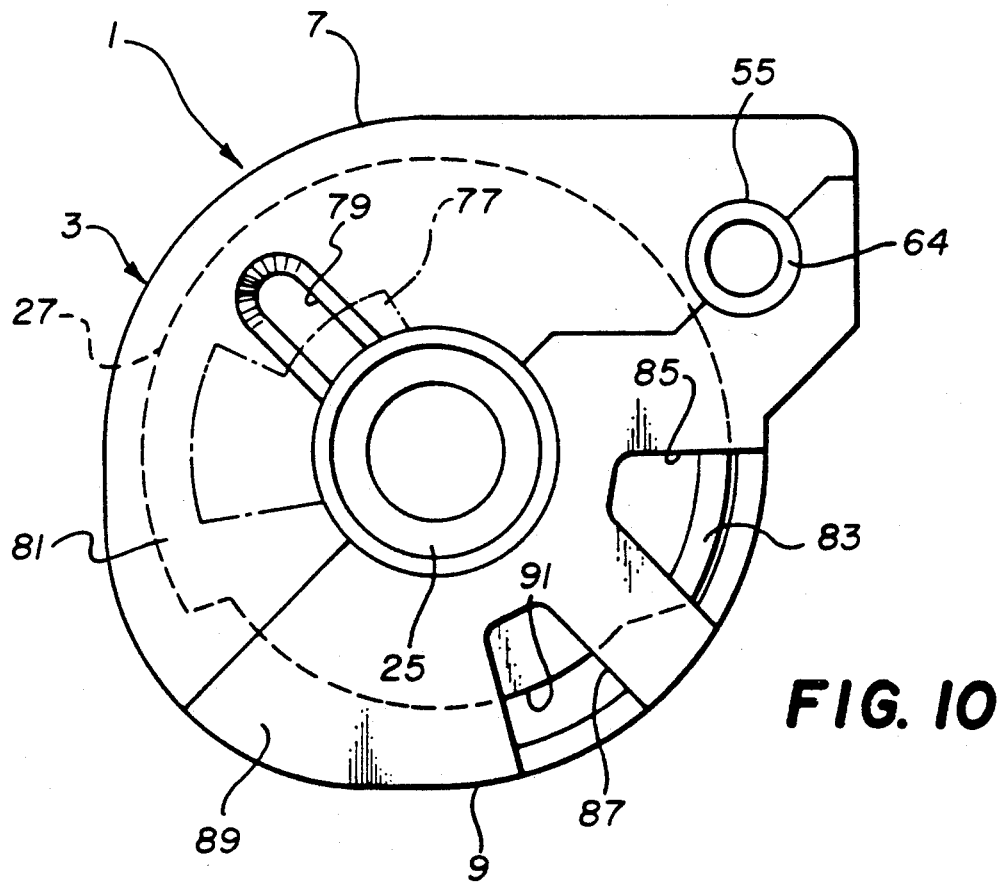
Figure 11:
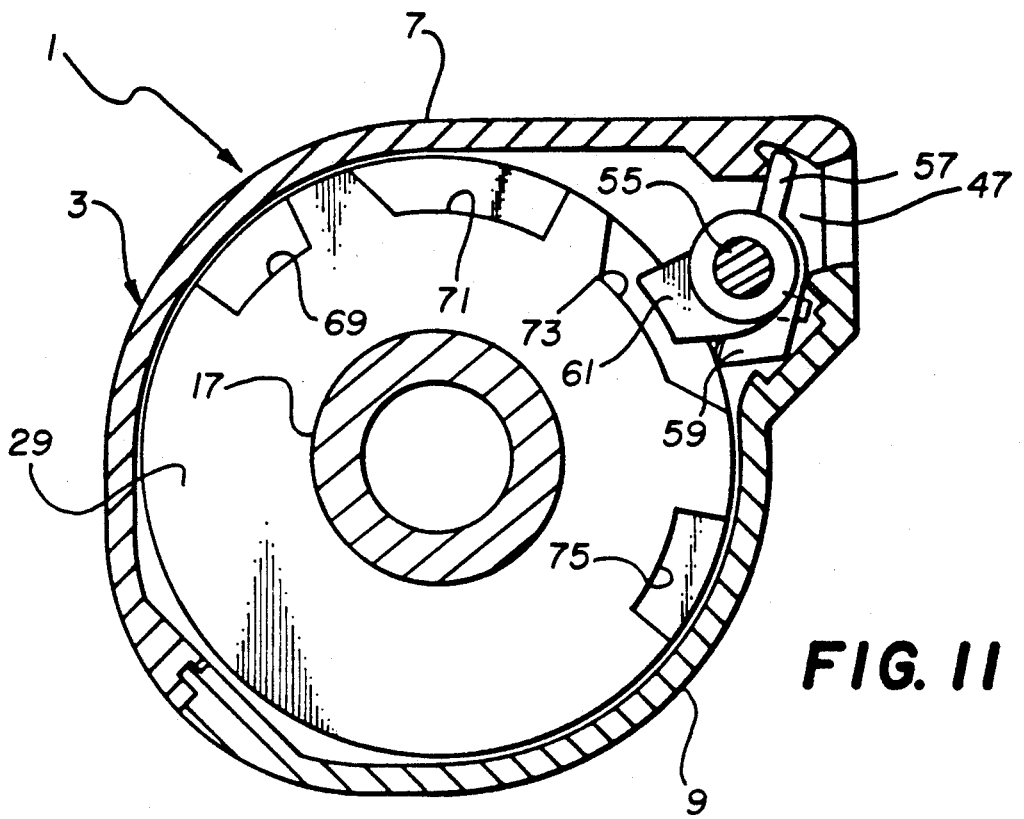
Figure 12:
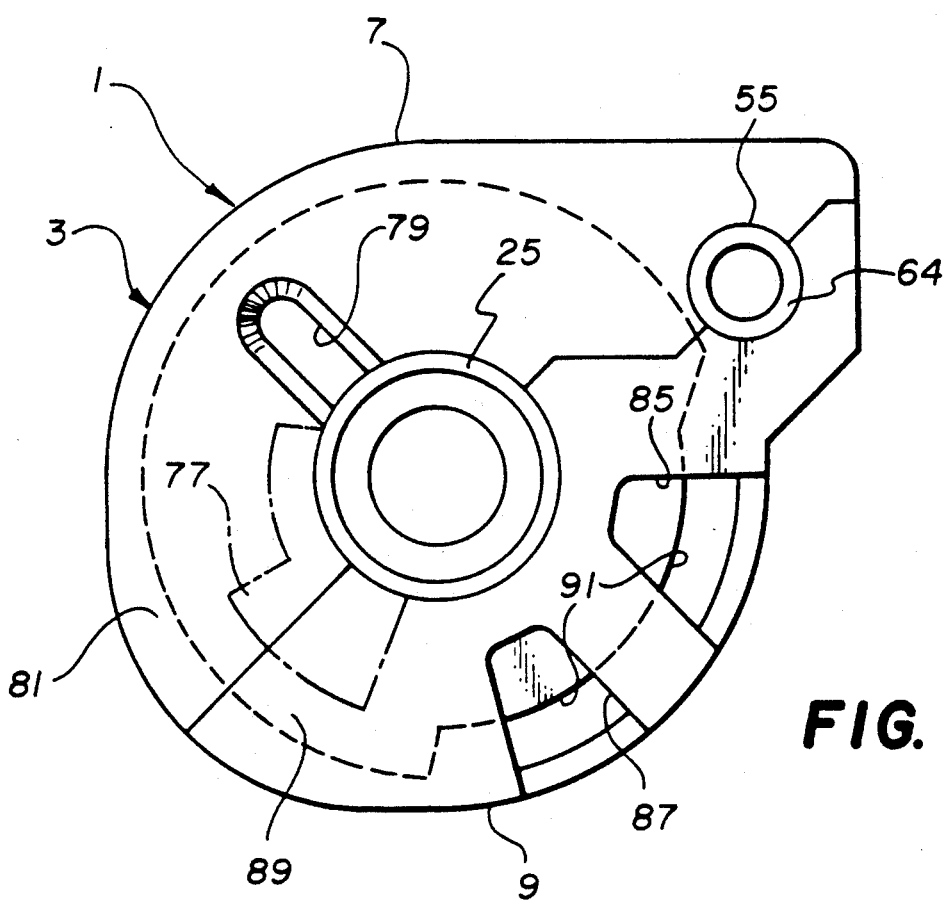
Figure 13:
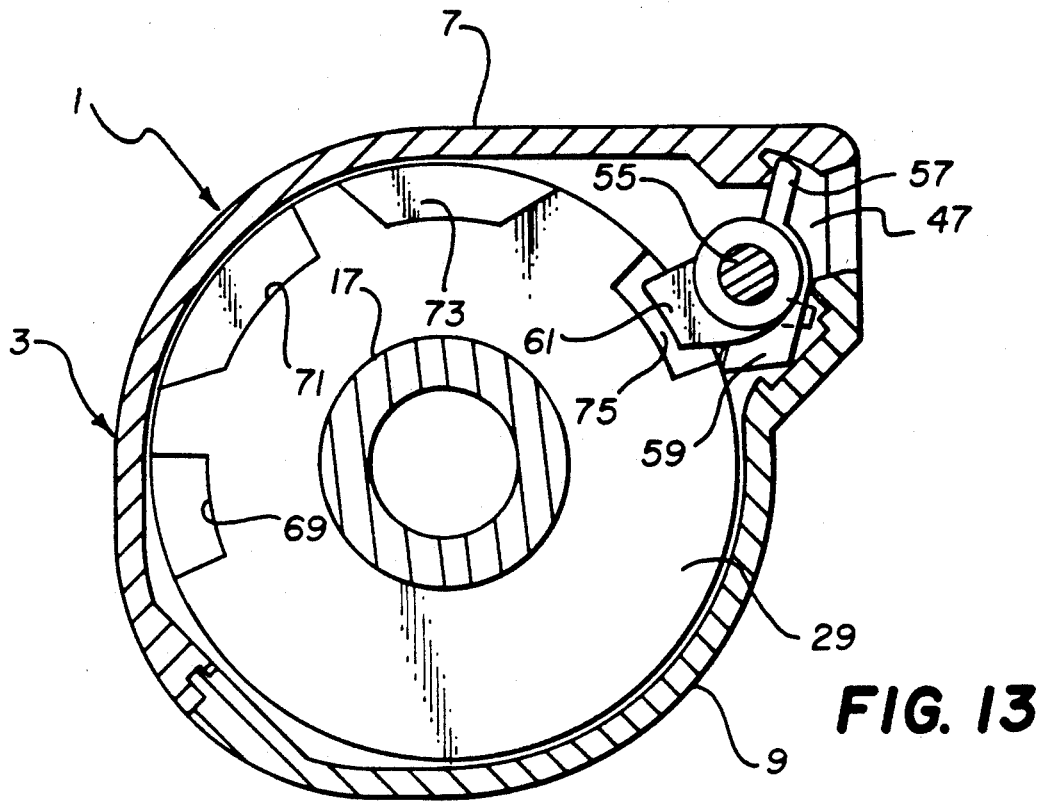
Figure 14:
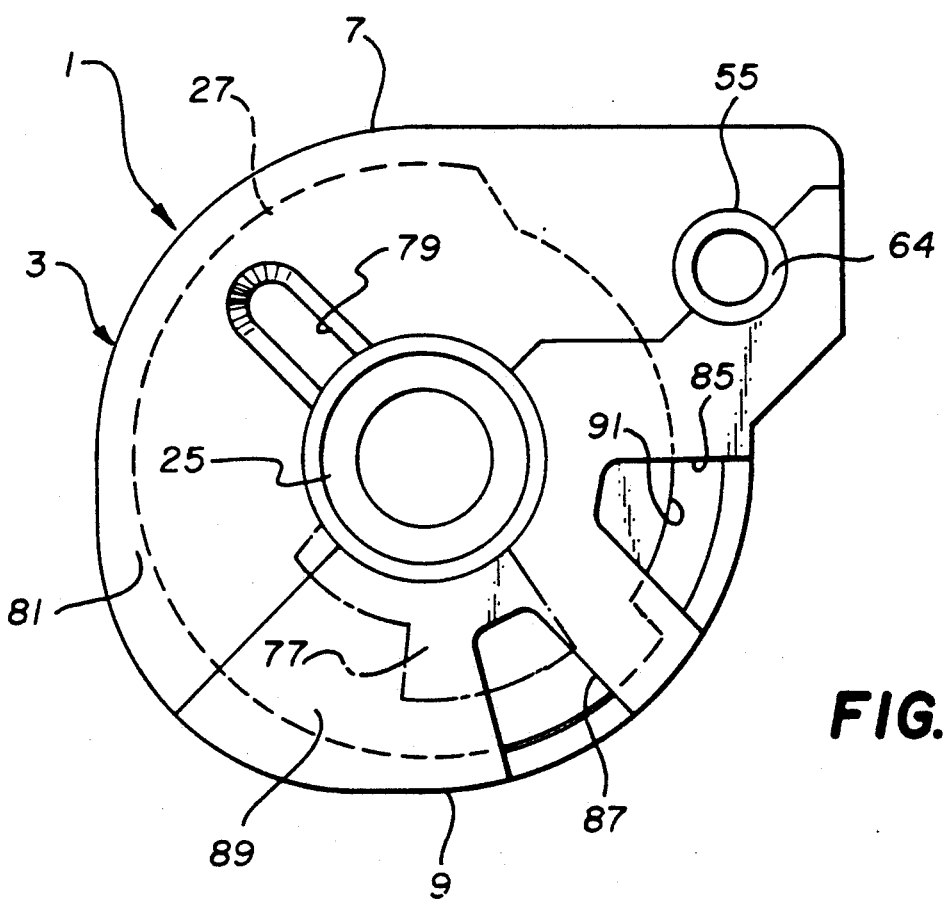

As shown in FIGS. 2 and 8, when the control shaft 55 is rotationally oriented with the light valve 57 in its non-blocking position, the spool lock 61 is in a non-locking position removed from the inner disk 29. Conversely, as shown in FIG. 6, when the control shaft 55 is rotationally oriented with the light valve 57 in its light blocking position, the spool lock 61 is in a locking position protruding into any one of four notches or detents 69, 71, 73 and 75 cut in the periphery of the inner disk 29, to prevent substantial rotation of the film spool 5 in the unwinding and winding directions U and W. Other details of the spool lock 61 are disclosed in cross-referenced application Ser. No. 07/787,356. When the spool lock 61 protrudes into the detent 69, the film spool 5 is rotationally arrested with a film exposure status indicator 77 completely filling a window 79 in one end 81 of the shell half 7, to visibly indicate the filmstrip F is unexposed (fresh). See FIGS. 6 and 7. Moreover, a beveled edge portion 83 of the outer disk 27 is present at two windows 85 and 87 in the end 89 of the shell half 9, to disable a cassette load prevention mechanism in a camera or other apparatus adapted to receive the film cassette 1. See FIG. 7. An example of the cassette load prevention mechanism is disclosed in commonly assigned U.S. Pat. Nos. 5,032,861, issued Jul. 16, 1991, and U.S. Pat. No. 5,047,794, issued Sep. 10, 1991. When the spool lock 61 protrudes into the detent 71, the film spool 5 is rotationally arrested with the exposure status indicator 77 only partly filling the window 79 to visibly indicate the filmstrip F is partly exposed. See FIGS. 9 and 10. Moreover, the beveled edge portion 83 is only present at the window 85. A cut-out edge portion 91 of the outer disk 27 is present at the window 87. See FIG. 10. Consequently, the cassette load prevention mechanism would be disabled at the window 87 but not at the window 85. This permits the film cassette 1 to be used with two different types of cameras, one that can receive the film cassette with the filmstrip F either partly exposed or unexposed and the other that can receive the film cassette only with the filmstrip unexposed. When the spool lock 61 protrudes into the detent 73, the film spool 5 is rotationally arrested with the exposure status indicator 77 completely removed from the window 79 to visibly indicate the filmstrip F is fully exposed. See FIGS. 11 and 12. Moreover, the cut-out edge portion 91 is present at the windows 85 and 87. See FIG. 12. Consequently, the cassette load prevention mechanism would be disabled at the windows 85 and 87. This is in order to prevent any type camera from receiving the film cassette 1 with the filmstrip F fully exposed. When the spool lock 61 protrudes into the detent 75, the film spool 5 is rotationally arrested with the exposure status indicator 77 completely removed from the window 79. However, another indicator, not shown, may be provided on the outer disk 27 to be present at the window 79 to visibly indicate the filmstrip F has been processed to develop any latent images. See FIGS. 13 and 14. Moreover, the cut-out edge portion 91 is present at the window 85 and the beveled edge portion 83 is present at the window 87. See FIG. 14. Consequently, the cassette load prevention mechanism would be disabled at the window 85 but not the window 87. This is in order to allow the film cassette 1 only to be received in apparatus other than a camera, such as an image display device, which would make use of the filmstrip F when it is processed.

The Spool Hook

As shown in FIGS. 15-18, the trailing end portion 101 of the filmstrip F has a pair of identical holes 105 in it. Each of the identical double-hook pieces 103, 103 of the spool core 17 has a shorter hook 107 and a longer hook 109. An undercut 111 in the spool core 17 beneath the longer hooks 109, 109 extends from respective undersides 113, 113 of the longer hooks to a flat 115 of the spool core substantially at the axis X. An undercut 117 in the spool core 17 beneath the shorter hooks 107, 107 is significantly shallower than the undercut 113.

Figure 19:
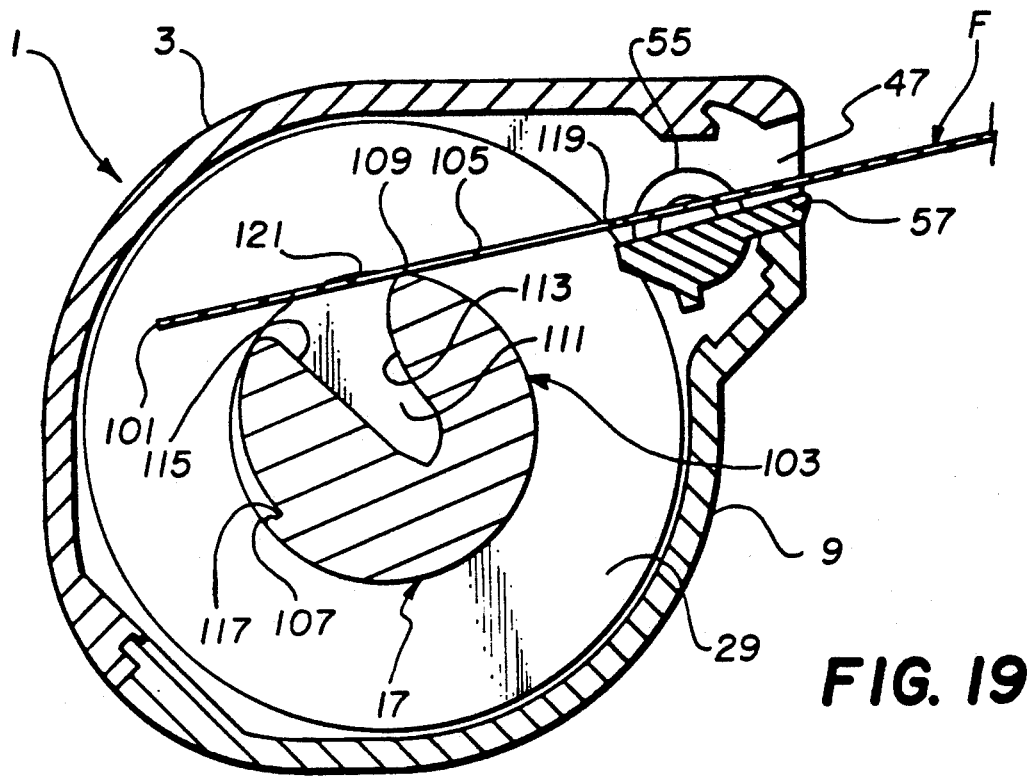
FIGS. 19-24 are plan views in cross-section of the film cassette, showing the manner of attaching the inner or trailing film end portion to the spool core.
Figure 20:
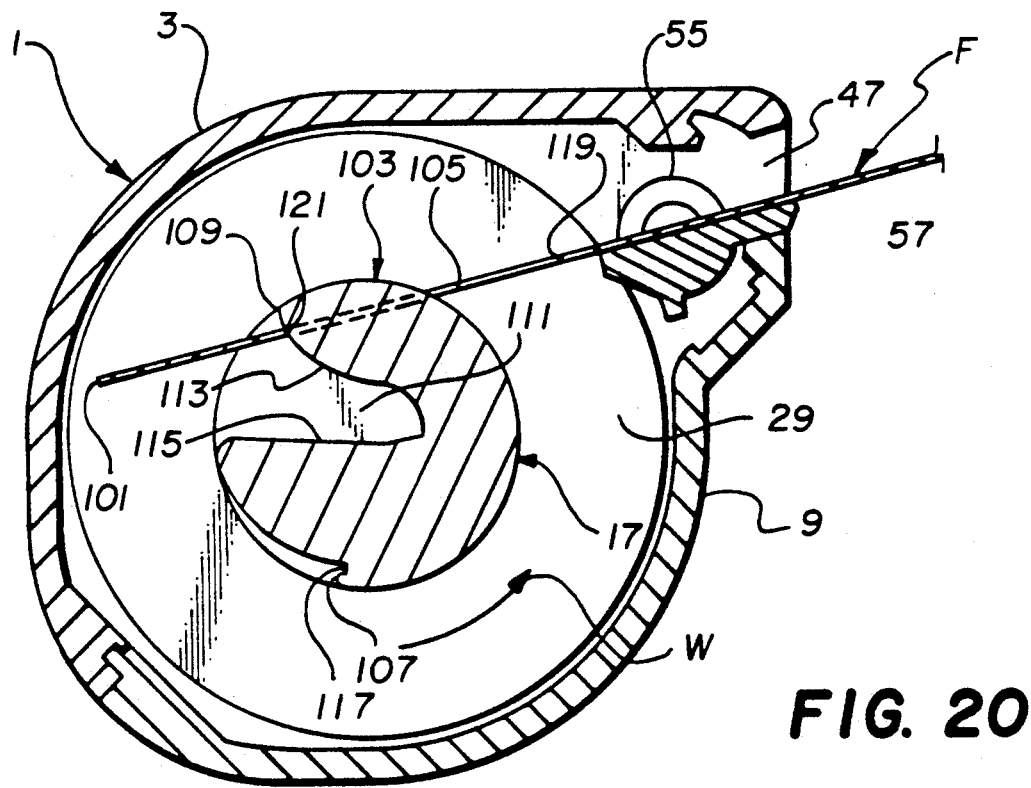
Figure 21:
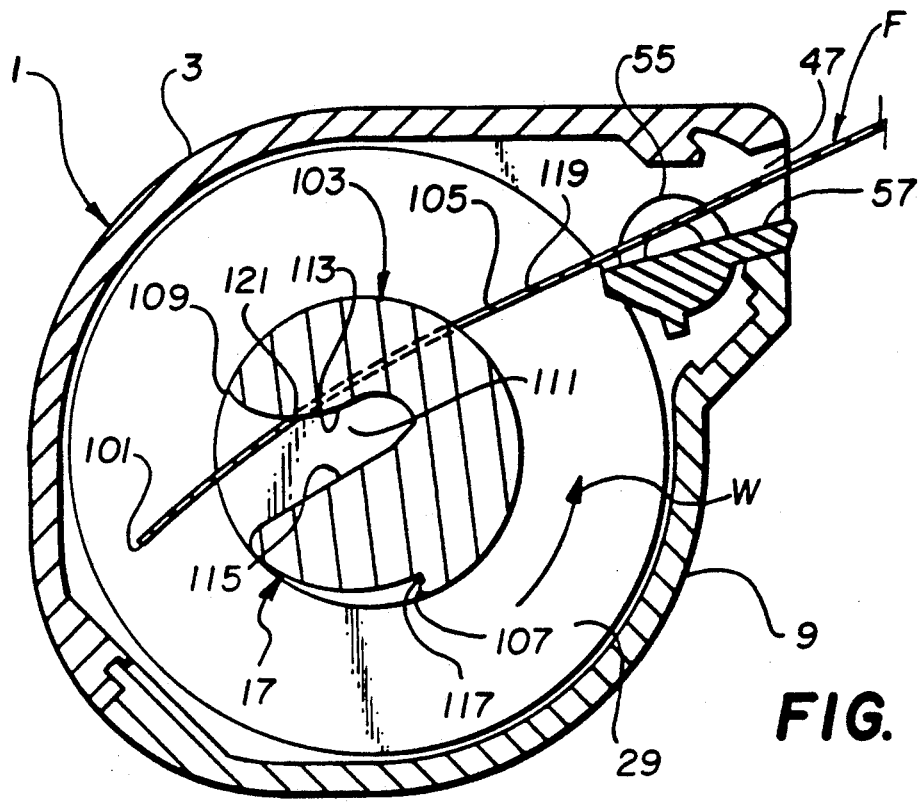
Figure 22:
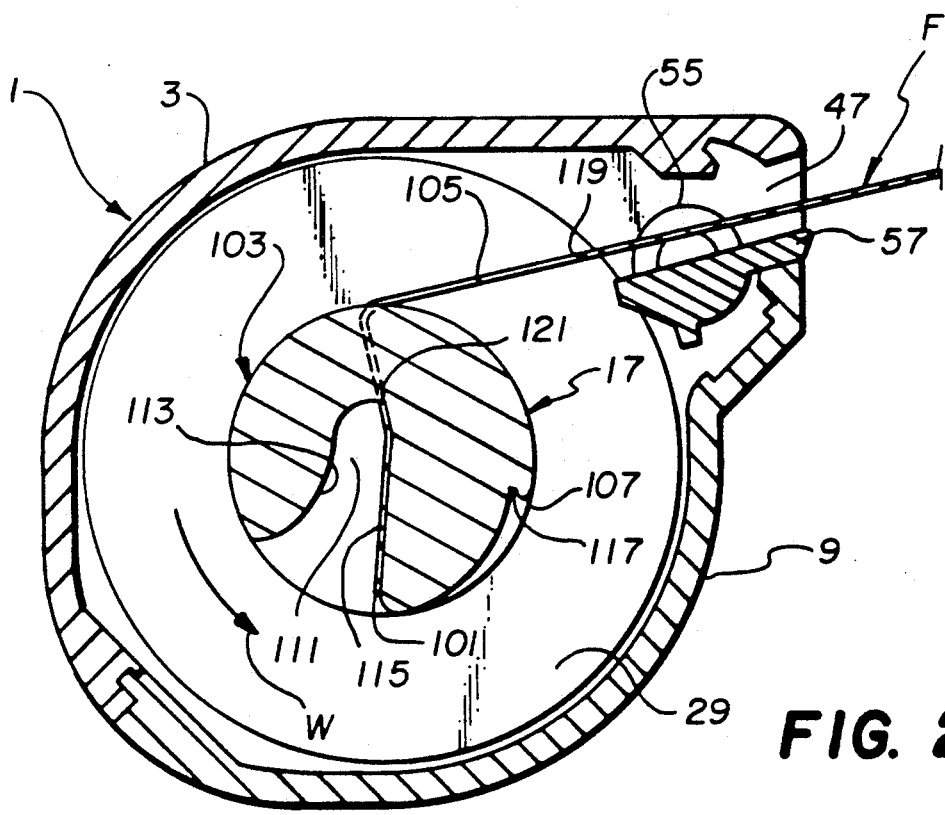
Figure 23:
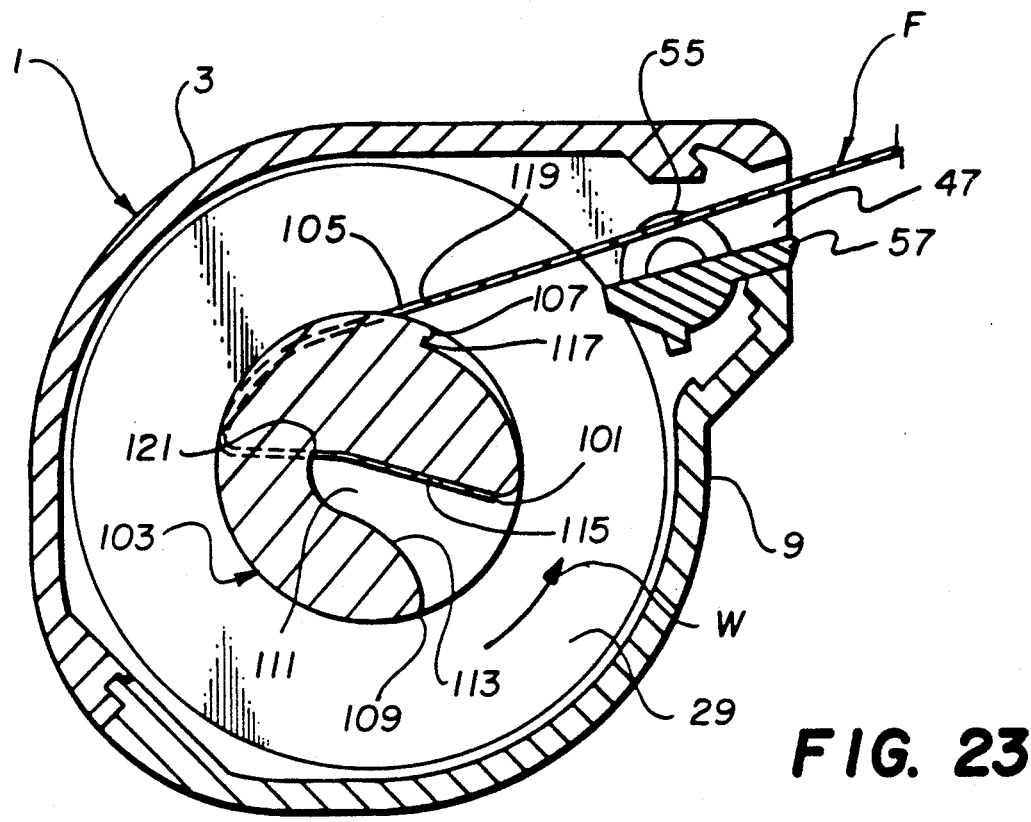
Figure 24:
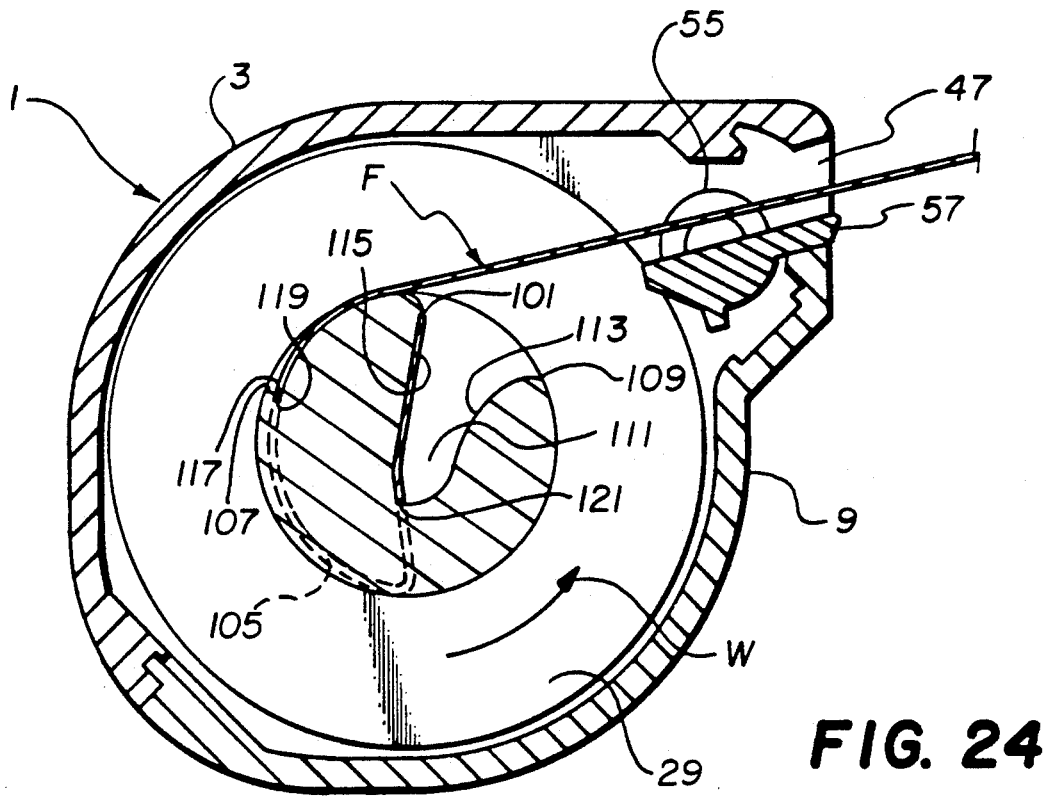

To attach the trailing end portion 101 of the filmstrip F to the double-hook pieces 103, 103, the trailing end portion is laid across the spool core 17 with the double-hook pieces located opposite the respective holes 105, 105 in the trailing end portion. See FIG. 19. Then, as shown in FIGS. 20-24, rotation of the spool core 17 in the winding direction W first moves the longer hooks 109, 109 into the respective holes 105, 105 and then moves the shorter hooks 107, 107 into the respective holes. As can be seen in FIGS. 20-22, movement of the longer hooks 109, 109 into the respective holes 105, 105 causes the undersides 113, 113 of these hooks to pull the trailing end portion 101 to the center or axis X of the spool core 17 where it is stopped by the flat 115.

Figure 25:
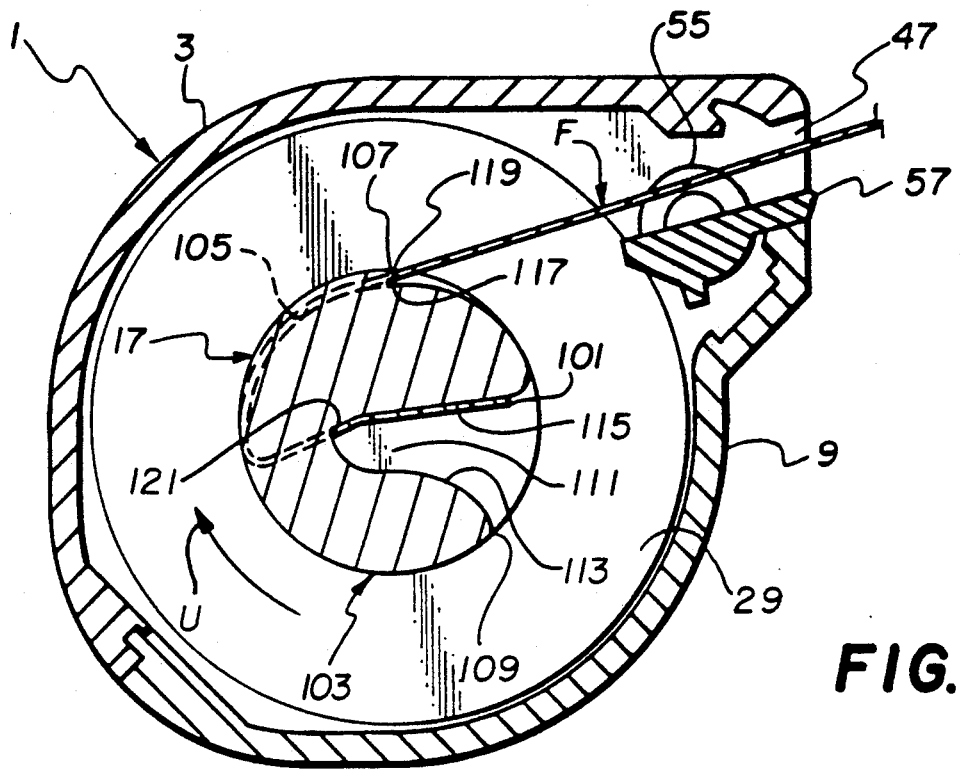
FIGS. 25-27 are plan views in cross-section of the film cassette, showing the manner of detaching the inner or trailing film end portion from the spool core.
Figure 26:
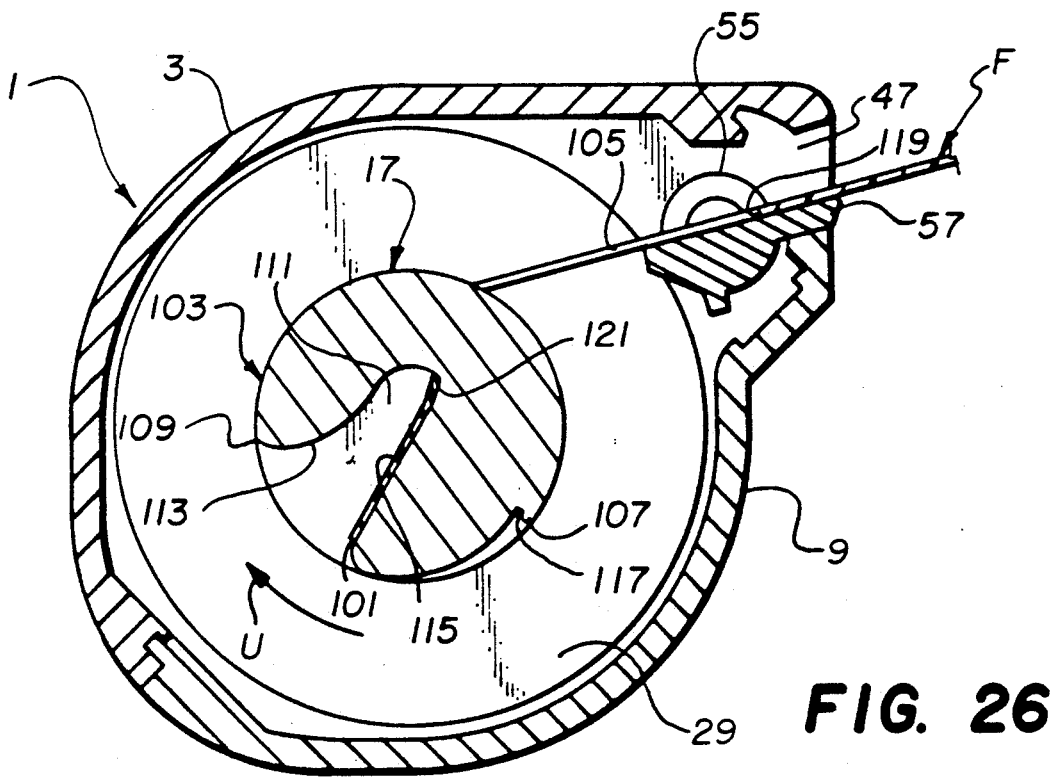

When the double-hook pieces 103, 103 are in the respective holes 105, 105, the shorter hooks 107, 107 are intended to project from the respective holes in the unwinding direction U to slightly overlie the trailing end portion 101 at individual edges 119, 119 of the respective holes to engage the trailing end portion for pushing the leading end portion 21 off the spool core 17 responsive to unwinding rotation of the spool core. See FIGS. 8, 15 and 25. Conversely, when the filmstrip F except for the trailing end portion 101 is wound off the spool core 17, the shorter hooks 107, 107 will exit the respective holes 105, 105 because the undercut 117 at each of the hooks is relatively shallow. See FIGS. 25 and 26.

Figure 27:
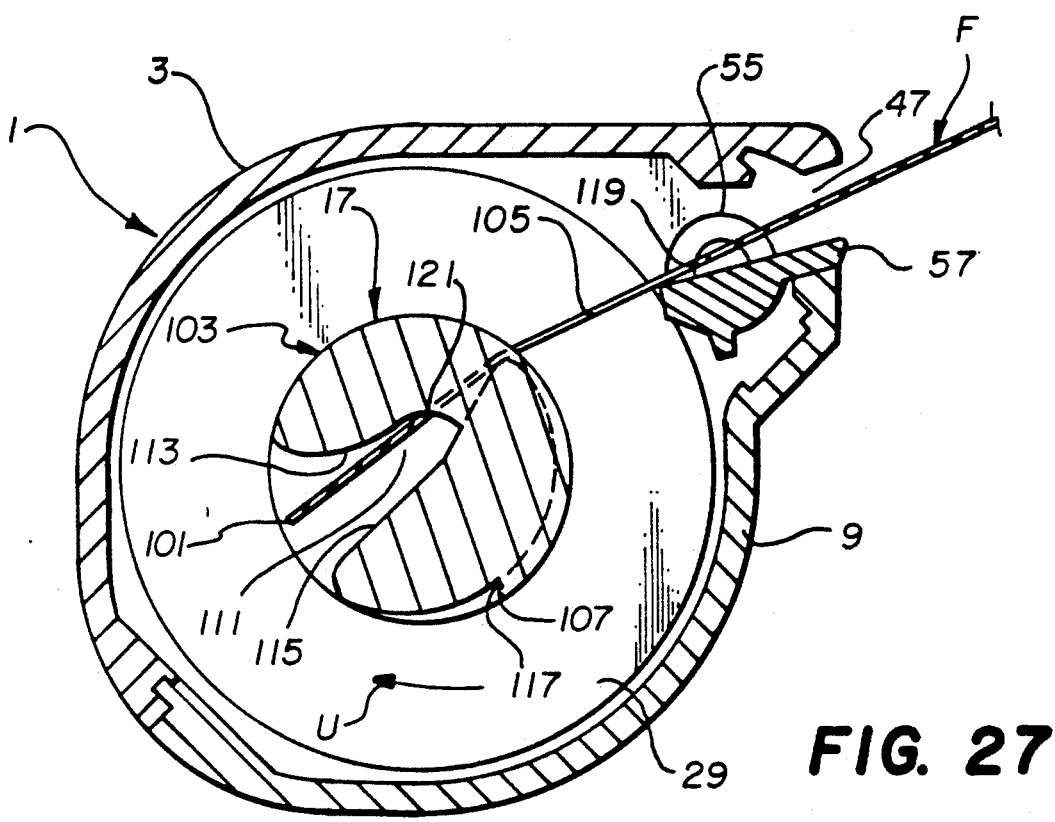

When the double-hook pieces 103, 103 are in the respective holes 105, 105, the longer hooks 109, 109 are intended to project from the respective holes in the winding direction W to substantially overlie the trailing end portion at individual edges 121, 121 of the respective holes to engage the trailing end portion for preventing it from completely separating from the spool core once the shorter hooks 107, 107 have exited the respective holes. See FIGS. 15 and 27. However, the longer hooks 109, 109 owing to their shape can be backed out of the respective holes 105, 105 by rotating the spool core 17 relative to the trailing end portion 101 in the unwinding direction U.

Cassette Operation

Initially, the control shaft 55 must be rotated to move the light valve 57 from its light blocking position to its non-blocking position, to move the spool lock 61 from its locking position to its non-locking position, and to move the film stripper 59 from its non-stripping position to its stripping position. See FIGS. 6 and 7.

Then, the spool core 17 is rotated relative to the flange 33 in the unwinding direction U until the two pieces are lockingly engaged by means of the locking pawl 52 and one of the detents 53, 54. See FIG. 5. Continued rotation of the spool core 17 in the same direction will similarly rotate the flange 33 to allow successive longitudinally sections of the filmstrip F beginning with its leading end portion 21 to exit from between the flange's annular lip 45 and the inner disc 29 along the 90° arc close to the film egress/ingress passageway 47 where the lip and the disc are spaced from each other a distance that is greater than the width W of the filmstrip F. Simultaneously, the film stripper 59 will direct successive longitudinal sections of the filmstrip F beginning with its leading end portion 21 into the passageway 47 for advancement outside the cassette shell 3.

The invention has been described with reference to a preferred embodiment. However, it will be appreciated that variations and modifications can be effected within the ordinary skill in the art without departing from the scope of the invention.

We claim:

1. A film cassette comprising interior means, including a spool core about which a filmstrip is coiled, for thrusting a leading end portion of said filmstrip from inside to outside said cassette responsive to rotation of said spool core in an unwinding direction and permitting the filmstrip to be wound onto the spool core when the spool core is rotated in a winding direction, in characterized in that:

said filmstrip has a trailing end portion with a hole in it; and said spool core includes a double-hook piece having first hook means projecting through the hole in the unwinding direction to slightly overlie said trailing end portion to engage the trailing end portion for pushing the filmstrip off the spool core to thrust said leading end portion outside said cassette when the spool core is rotated in the unwinding direction, but which will exit the hole as the trailing end portion begins to separate from the spool core when the spool core is rotated in the unwinding direction, and second hook means, relatively longer than first hook means, projecting through the hole int he winding direction to substantially overlie the trailing end portion to engage the trailing end portion for preventing the trailing end portion from completely separating from the spool core when the first hook means is removed from the hole, but which can be backed out of the hole by rotating the spool core relative to the trailing end portion in the unwinding direction after the first hook means is removed from the hole.

2. A film cassette as recited in claim 1, wherein said spool core has an undercut beneath said second hook means that extends from an underside of the second hook means substantially to a rotational axis of the spool core.

3. A film cassette as recited in claim 2, wherein said spool core has an undercut beneath said first hook means that is shallower than said undercut beneath said second hook means.

* * * * *

UNITED STATES PATENT AND TRADEMARK OFFICE
CERTIFICATE OF CORRECTION

PATENT NO. : 5,295,634
DATED : March 22, 1994
INVENTOR(S) : Zander, et al

It is certified that error appears in the above-indentified patent and that said Letters Patent is hereby corrected as shown below:

In Column 6, line 67, delete "direction, in" and insert --direction, is--.
In Column 7, line 15, delete "int he" and insert --in the--.

Signed and Sealed this

Eighteenth Day of October, 1994

Attest:

BRUCE LEHMAN

*Attesting Officer*      *Commissioner of Patents and Trademarks*